United States Patent [19]
Sankar

[11] Patent Number: 5,867,822
[45] Date of Patent: Feb. 2, 1999

[54] METHOD AND APPARATUS FOR MANAGEMENT OF ELECTRONIC CALENDARS THROUGHOUT AN ENTERPRISE AND MANAGEMENT OF EVENTS IN A DISTRIBUTED SYSTEM

[75] Inventor: Sriram Sankar, Freemont, Calif.

[73] Assignee: Sun Microsystems, Inc., Mountain View, Calif.

[21] Appl. No.: 669,747

[22] Filed: Jun. 26, 1996

[51] Int. Cl.$^6$ ................................. G01D 09/00
[52] U.S. Cl. ................... 705/8; 705/9; 395/601
[58] Field of Search .................. 705/8, 9; 364/705, 364/8; 395/601, 603

[56] References Cited

U.S. PATENT DOCUMENTS

| | | | |
|---|---|---|---|
| 4,817,018 | 3/1989 | Cree et al. | 364/518 |
| 5,070,470 | 12/1991 | Scully et al. | 364/569 |
| 5,416,473 | 5/1995 | Dulaney, III et al. | 340/825.44 |

*Primary Examiner*—Thomas Peeso
*Attorney, Agent, or Firm*—Blakely Sokoloff Taylor & Zafman

[57] ABSTRACT

An enterprise electronic calendar uses new enterprise protocols and mechanisms to implement the new enterprise protocols in an enterprise setting. The enterprise electronic calendar may perform activities such as automatically performing simple tasks that can be programmed. The enterprise electronic calendar works closely with new enterprise electronic calendar protocols in order to best support an enterprise and supports databases for a large organization where individuals must work towards common tasks. In a presently preferred embodiment of the present invention, a collection of four components closely interact with each other. The components are software based and reside in computers, workstations and palmtops linked through some type of network. The components include a timestamp controller (TSC), a graphical user interface (GUI), a protocol checking process (PCP) and a system administrator interface (SAI). Application as a manager of events in a distributed system is also provided.

21 Claims, 6 Drawing Sheets

METHOD AND APPARATUS FOR MANAGEMENT OF ELECTRONIC CALENDARS THROUGHOUT AN ENTERPRISE AND MANAGEMENT OF EVENTS IN A DISTRIBUTED SYSTEM

BACKGROUND OF THE INVENTION (1) Field of the Invention

The method and the apparatus of the present invention is related to the field of electronic timers. More specifically, the present invention is related to a method and apparatus for managing the electronic calendars of personnel throughout an enterprise or for managing events in a distributed system.

(2) Prior Art

Currently, there are many tools available to help manage a person's daily activities. For example, there are simple diaries which may be purchased at a stationary store consisting of individual pages in a notebooklike format with each page having the day of each month in a year. Such a diary may be utilized to keep one's to do lists and reminders for each day. Additionally, there are different types of software currently available which accomplish the task of helping a user keep a record of his or her appointments. Such software is implemented as components of electronic calendar of personal digital assistants such as the Apple Newton and the Hewlett Packard Palmtop.

The disadvantage with currently available electronic calendars is that they only provide minimum support for interaction amongst electronic calendar users in a large organization. For example, Sun Microsystems's Calendar Manager, is an example of an electronic calendar which provides a user with a capability to browse other employee's calendars in the company and to look for mutually free times in order to make appointments with other users. Although the Calendar Manager provides browsing, it does not offer any additional significant enterprise oriented capability.

FIG. 1 illustrates a set of functionalities typically available on traditional electronic calendars. Traditional electronic calendar 100 accepts user or event inputs of to do lists 102 and appointment entries 104. Traditional electronic calendar 100 also provides browsing capability 106 and outputs reminders 108 to the user. Although some electronic calendars may provide interaction 110 with other electronic calendars, such interaction 110 is minimal. For example, some traditional electronic calendars 100 may provide an e-mail capability allowing for users to send and receive electronic mail. Thus, the interaction currently available amongst multiple users of electronic calendars is very limited.

The lack of support in currently available electronic calendars for an enterprise such as a large organization requires each individual electronic calendar user to perform extra tasks burdening them with administrative details. For example, if a user A desires to have a meeting with users B and C, user A must determine a date on which both users B and C will be able to meet. To this end, user A must browse through users B and C's calendars to determine the most convenient time for all three to meet at the same time. It would be much more efficient if user A only had to input minimum information regarding his or her desire to meet with users B and C in order to set up the meeting. More specifically, it would be desirable for an electronic calendar to be able to schedule a meeting automatically if given certain minimal parameters, such as the names of users requested to attend the meeting and a range of dates within which the meeting should be held.

The above example is only one of many functions which would be desired in an electronic calendar used in an enterprise setting. Such an electronic calendar can improve overall efficiency of an enterprise by automating enterprise oriented tasks. A method and an apparatus using new enterprise electronic calendar protocols to provide enterprise oriented capabilities to an electronic calendar are therefore desired. These same protocols also have application for the management of events in a distributed system.

BRIEF SUMMARY OF THE INVENTION

A method and an apparatus for managing electronic calendars which addresses the needs of a large organization where many people work together to achieve common tasks are disclosed. The invention uses a time stamp manager or controller and a protocol checking process which have more general purpose application for checking event constraints in a distributed system. In this connection, it should be understood that while the following description is in terms of an electronic calendar, the techniques employed can also be used to manage events in a distributed system where the "user" is a software agent rather than a person working at a particular workstation.

The enterprise electronic calendar of the present invention follows new enterprise electronic calendar protocols giving the traditional electronic calendar capabilities to support a large organization or an enterprise.

In a presently preferred embodiment of the present invention, a collection of four components closely interact with each other. The components are software based and reside in computers, workstations and palmtops linked through some type of network. The components include a timestamp controller (TSC), a graphical user interface (GUI), a protocol checking process (PCP) and a system administrator interface (SAI).

A GUI is a type of computer interface interfacing a user with a computer and is well known in the art. A GUI typically consists of a visual metaphor of a real world scene, often a desktop. Within that scene are icons, representing actual objects, that the user can access and manipulate with a pointing device. Here, the GUI is a component through which the user interacts with the present invention's enterprise electronic calendar. Through the GUI, the user may specify the occurrence of an event such as "résumé arrived" from a palette of predefined events. The predefined events may be displayed in a menu format on the screen of a computer implemented with the present invention for the user to select an event.

Upon receipt of a user input, the GUI passes the input to the TSC. The GUI also receives various types of information from the PCP, such as messages for the user, based on which the GUI provides information back to the user. For example, the GUI may sound a beep on the computer when the GUI receives information from the PCP that it's time to remind the user of a particular appointment.

The TSC takes input events from the user through the GUI and stamps the events with time information. The TSC then passes the events onto any of the four components of the invention which has made a request for them. Since actions to be performed for different input events typically depend on a predetermined sequence of input events, TSC's task is to allow all components of the invention to keep track of each input event's order of occurrence.

The PCP is one of the key elements of the present invention's enterprise electronic calendar and processes user or event inputs according to a set of rules or protocols based on which a given enterprise operates. The set of protocols may vary from enterprise to enterprise. In one embodiment of the present invention, the set of protocols is stored in an enterprise protocols database. The PCP determines compliance of a user's activity with the protocols and provides feedback in the form of reminders, e-mail, etc. to the user through the GUI.

Sometimes new protocols need to be added and old protocols need to be deleted or modified in the PCP. Through the SAI, a system administrator in charge of the enterprise electronic calendar can perform these activities. The SAI of the present invention is a UI (user interface) allowing the system administrator to interface with the PCP. The SAI may be implemented in various ways. For example, an application may be written which allows a menu to pop up on the screen of a computer giving the system administrator a selection of command entries for editing the PCP. Once the user or event inputs an edit command to the computer through the SAI, the SAI edits the set of rules and protocols used by the PCP according to the user or event input by, for example, creating a new protocol or deleting or modifying an existing protocol.

In this way, the present invention provides a new and improved electronic calendar using new enterprise protocols and mechanisms to implement an enterprise electronic calendar.

DETAILED DESCRIPTION OF THE INVENTION

An enterprise electronic calendar with capabilities to support an enterprise such as a large organization is described herein. The invention has equal application for the management of events in a distributed system, i.e., a system of computers which operate cooperatively and are coupled to each other over a network. For the most part, this description is set forth in terms of enterprise electronic calendar network, however, the invention has equal application for the management of events in a distributed system, and its application in such environment should be readily apparent to persons skilled in the relevant art.

Figure 1:
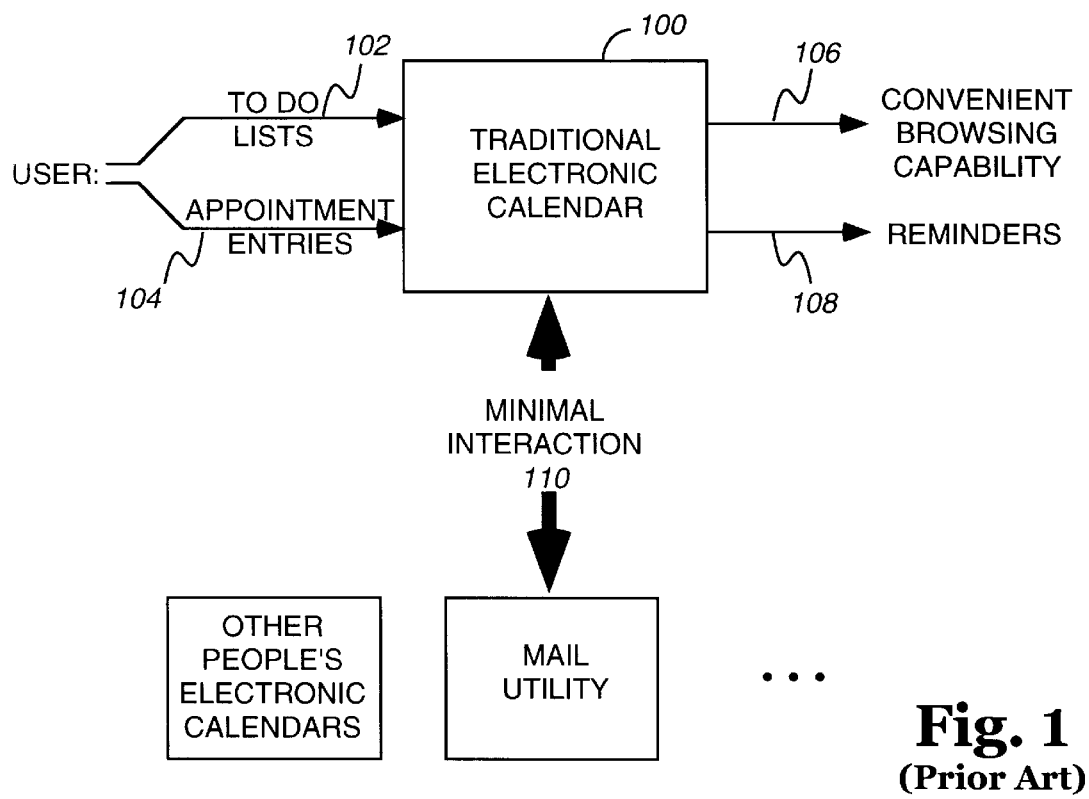
FIG. 1 illustrates the minimal functionality of a traditional electronic calendar.
Figure 2:
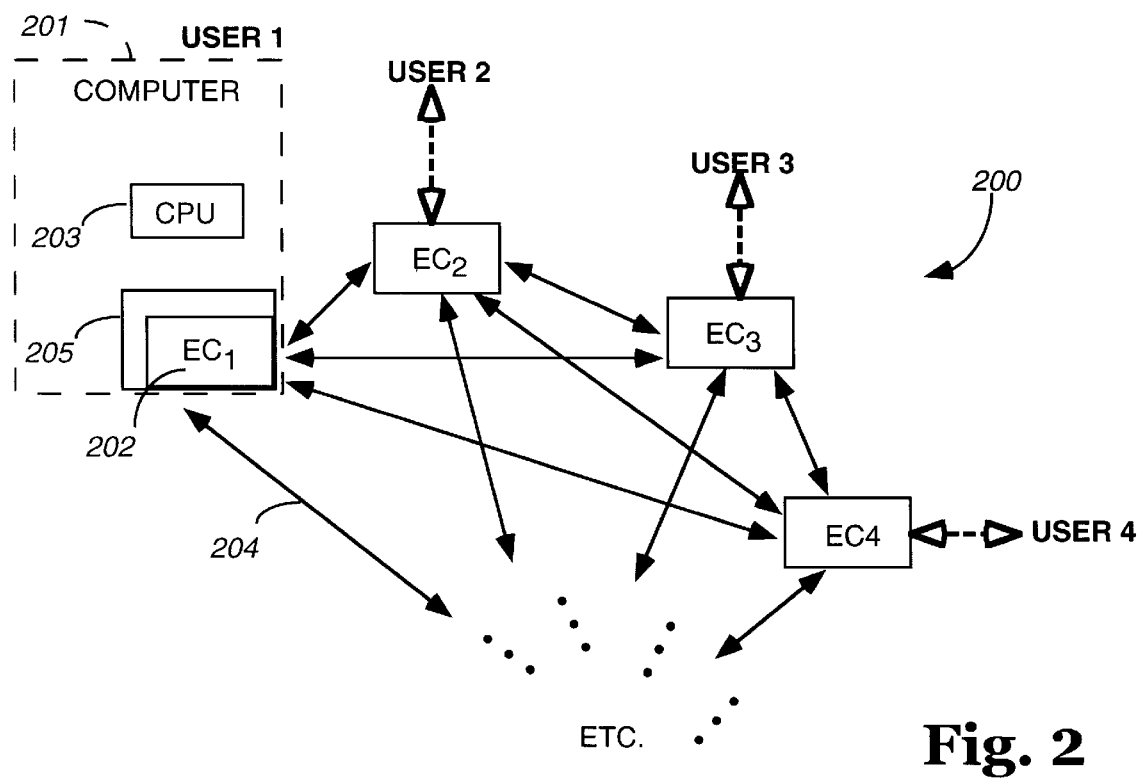
FIG. 2 illustrates a network of enterprise electronic calendars in an organization.

FIG. 2 illustrates a network of enterprise electronic calendars in an organization. In the presently preferred embodiment, enterprise electronic calendar 202 is software based and resides in storage device 205 of computer 201 and is processed by CPU (Central Processing Unit) 203. Enterprise electronic calendar 202 of each user in enterprise 200 communicates with each other through, for example, computer network 204. In addition to being distributed over network 204, enterprise electronic calendar 202 can also be one or more complex agents performing all activities in one place.

Figure 3:
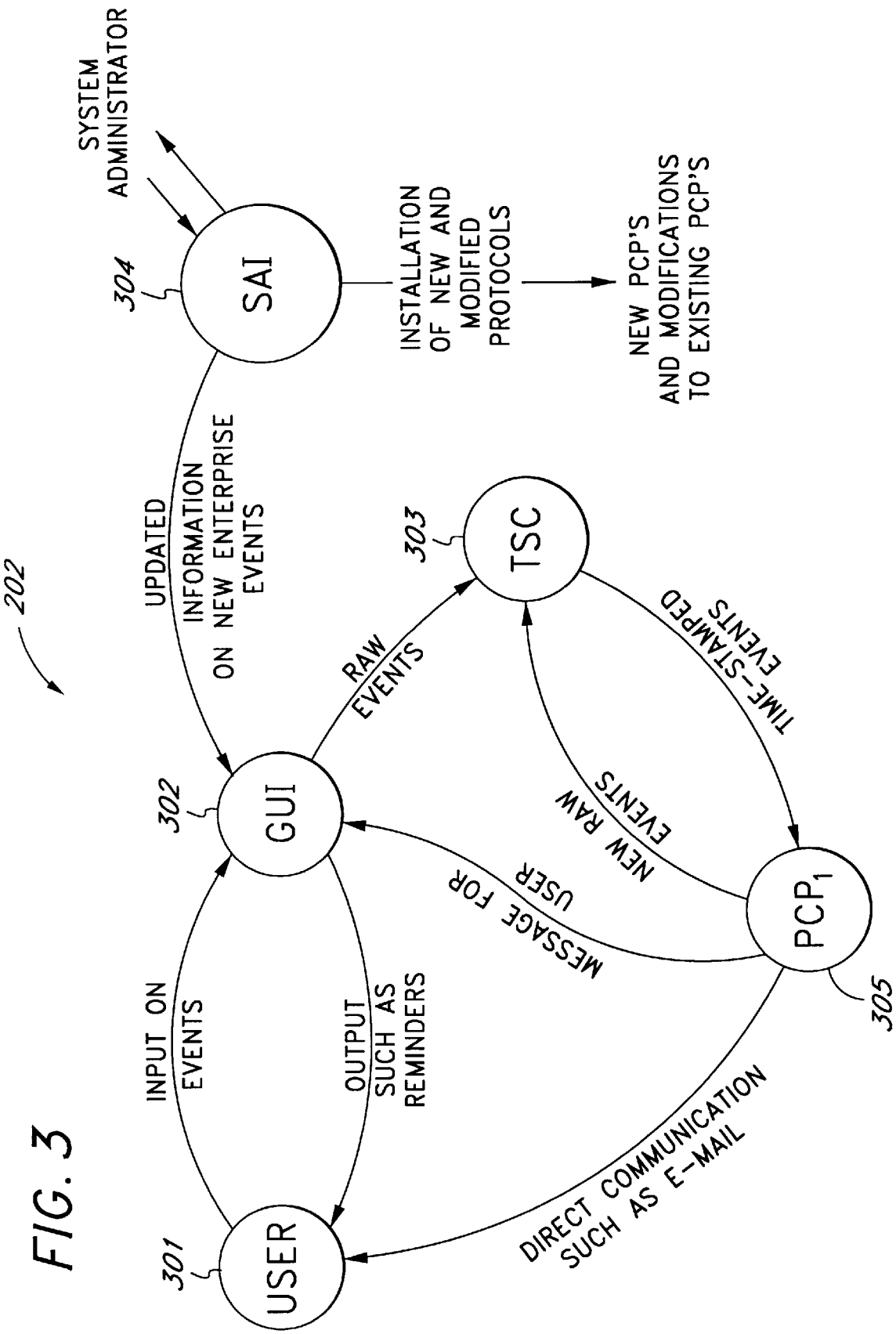
FIG. 3 illustrates an exemplary embodiment of the present invention.

FIG. 3 illustrates an exemplary embodiment of the present invention. The exemplary embodiment for enterprise electronic calendar 202 is illustrated with a collection of four components which closely interact with each other. The components include timestamp controller (TSC) 303, graphical user interface (GUI) 302, protocol checking process (PCP) 305 and system administrator interface (SAI) 304. The components are affected by inputs from user 301 through GUI 302 and SAI 304. Alternatively, instead of the inputs which affect the components coming from a user, the inputs may come from software agents in a distributed system. Of course, in this embodiment, there would be no need for a GUI.

TSC 303 of the present invention is a component which monitors events occurring on different computers and stamps them with time information to determine the order between two events. TSC 303 is implemented as a separate process which is always running in the background on some computer. For optimizing network traffic, separate TSC's 303 may be run on different computers across the network. Time stamping electronic information traveling through a computer is well known in the art. In FIG. 3, it is assumed for illustration purposes that there is only one TSC 303.

A GUI is a type of computer interface interfacing a user with a computer and is well known in the art. A GUI typically consists of a visual metaphor of a real world scene, often a desktop. Within that scene are icons, representing actual objects, that the user can access and manipulate with a pointing device. Here, GUI 302 is a component through which user 301 interacts with the present invention's enterprise electronic calendar. Through GUI 302, user 301 may specify the occurrence of an event such as "résumé arrived" from a palette of predefined events. The predefined events may be displayed in a menu format on the screen of computer 201 for the user to select an event. GUI 302 may then pass the information onto TSC 303 for timestamping. GUI 302 also receives various types of information from PCP 305, such as messages for user 301, based on which GUI 302 provides information back to user 301. For example, GUI 302 may sound a beep on user 301's computer when it receives information from PCP 305 that it's time to remind user 301 of a particular appointment by sounding a beep.

Figure 6A:
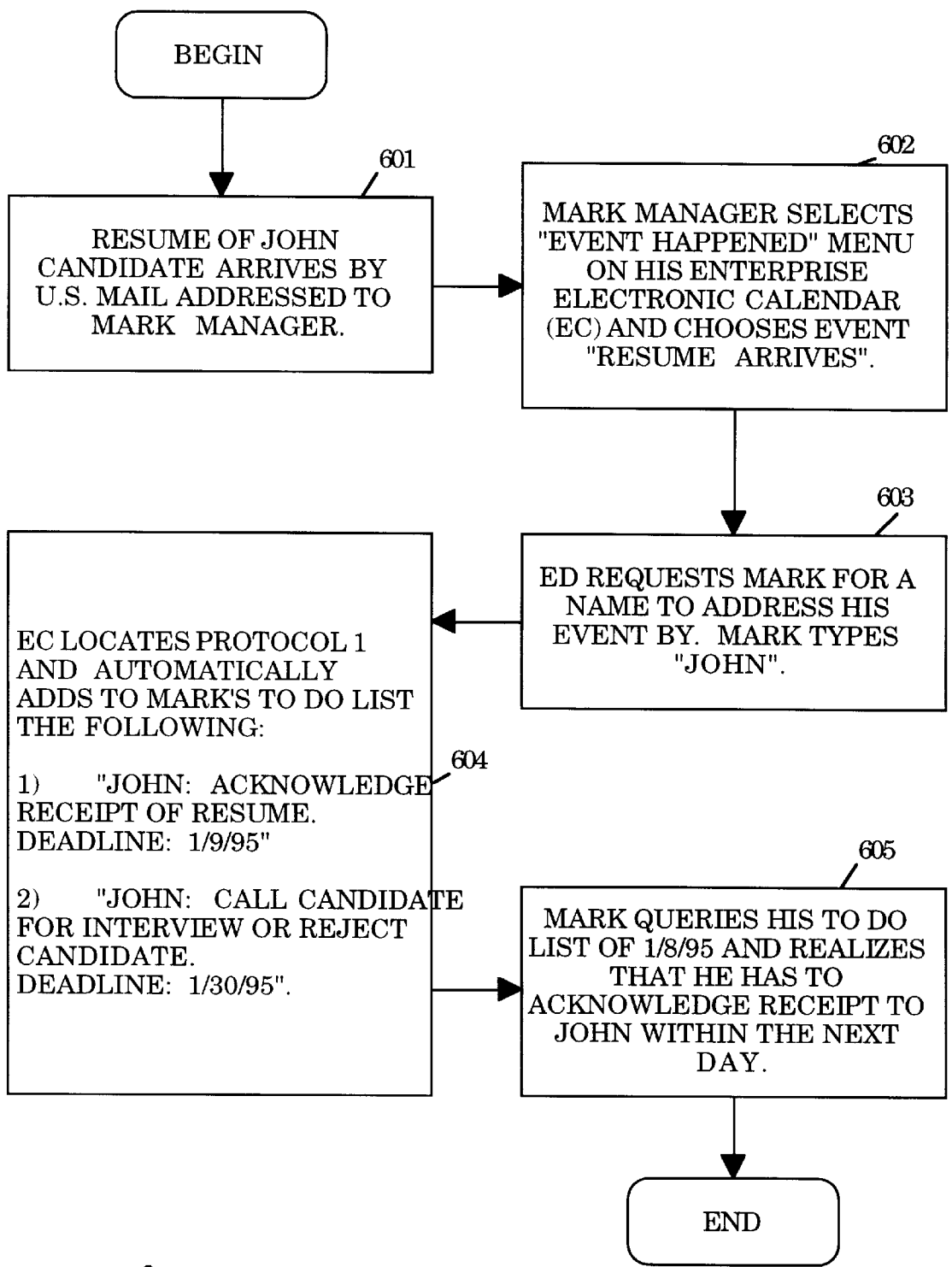
FIG. 6a is a flow diagram illustrating the use of an exemplary enterprise protocol.
Figure 6B:
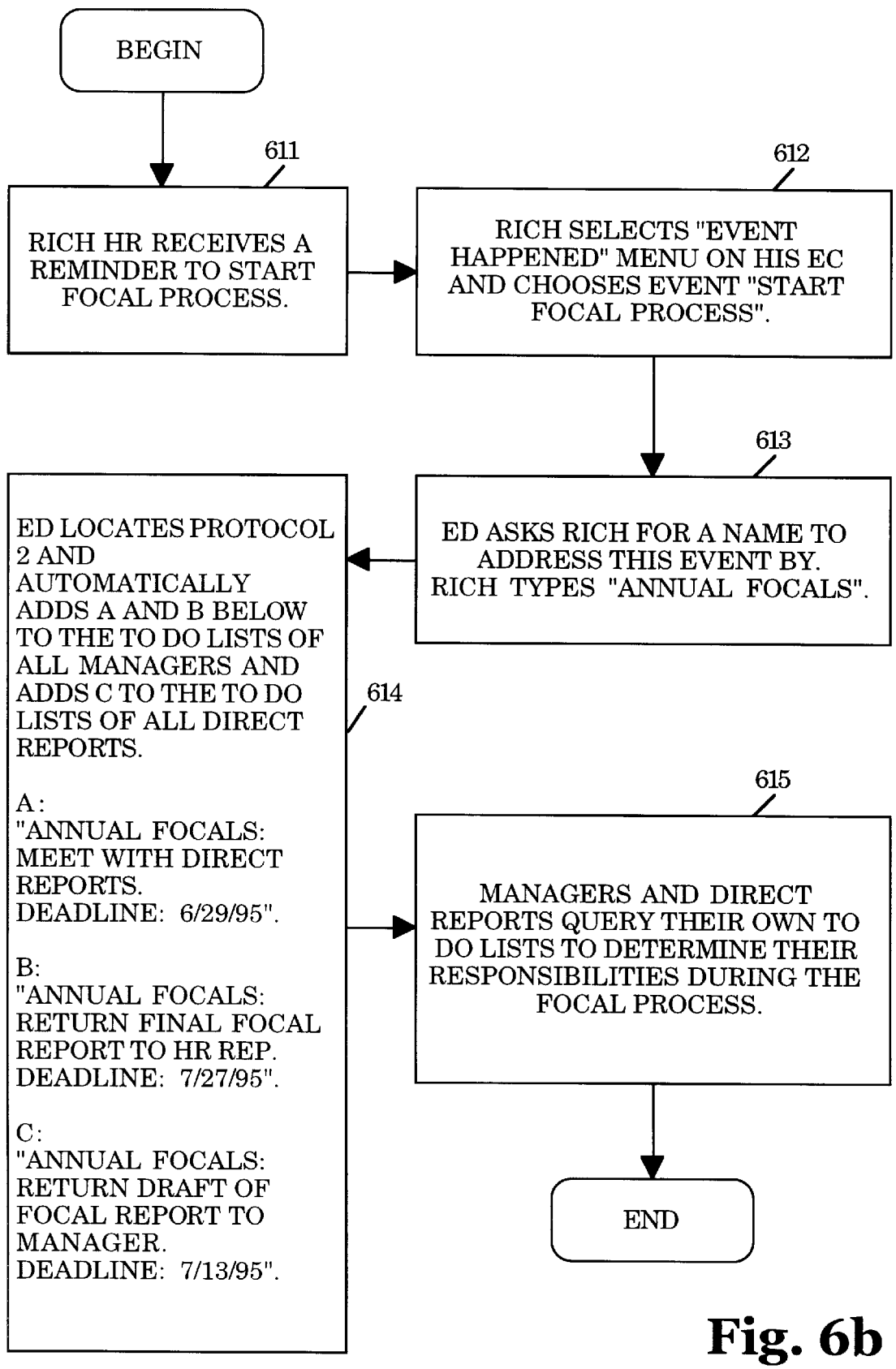
FIG. 6b is a flow diagram illustrating the use of another exemplary protocol.

The key element of the present invention's enterprise electronic calendar or event manager is a set of rules or protocols based on which the enterprise (or distributed system) operates. Examples of these rules are illustrated in FIGS. 6a and 6b and the description accompanying the figures. The set of protocols are stored in an enterprise protocols database described in the description accompanying FIG. 4 below. PCP 305 is the component which determines compliance of a user's activity with the protocols and provides feedback in the form of reminders, e-mail, etc. to user 301 through GUI 302. PCP 305 matches user or event inputs to a protocol in the enterprise protocols database. If no matching protocol exists in the enterprise protocols database, then error processing is performed by for example displaying an error message to user 301. Otherwise, if there is a protocol for the user or event input, then a set of actions are performed according to the protocol. Examples of event processing using enterprise protocols is illustrated in the description accompanying FIGS. 6a and 6b.

To edit protocols, a system administrator in charge of the enterprise electronic calendar may add new protocols and delete or modify existing protocols through SAI 304. SAI 304 of the present invention is a UI (user interface) allowing the system administrator to interface with PCP 305. SAI 304 may be implemented in various ways. For example, a program may be written providing a GUI which allows a menu to pop up on the screen of a computer giving the system administrator a selection of command entries for editing the protocols. Once the user or event input relays an edit command to the computer through SAI 304, SAI 304 edits the set of rules and protocols used by PCP 305 according to the user or event input.

Figure 4:
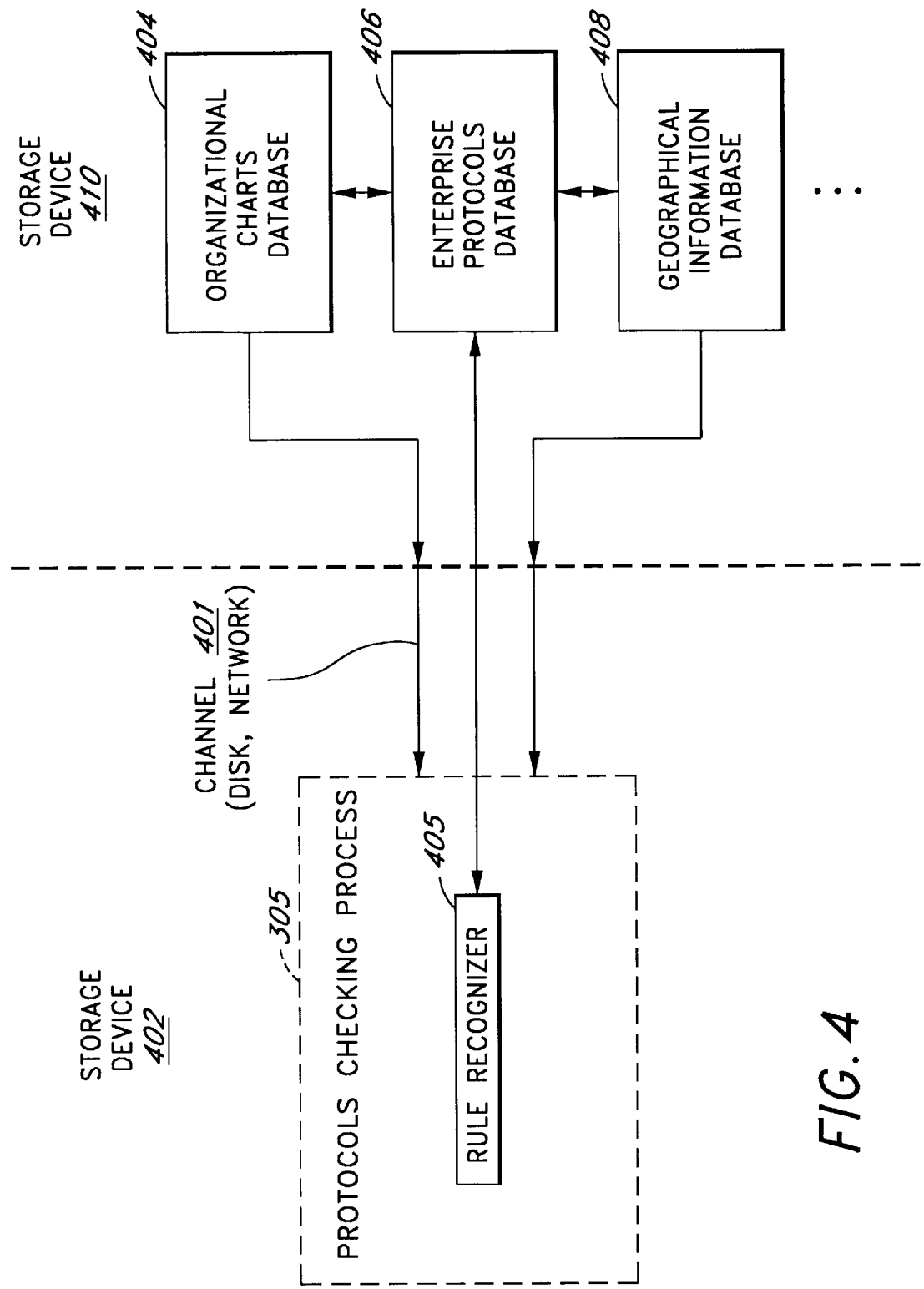
FIG. 4 illustrates an exemplary embodiment of the Protocol Checking Process of the present invention.

FIG. 4 illustrates the Protocol Checking Process of the present invention. Protocol checking process (PCP) 305 of enterprise electronic calendar 400 is coupled to enterprise protocols database 406 for storing enterprise protocols. Enterprise protocols database 406 can be extended with customized protocols to meet the specific needs of different organizations. Enterprise 400 is also coupled to directory information database 408 for storing a list of all users in an enterprise and corresponding addressing information and organizational charts database 404 which is one type of enterprise protocols database 406. More specifically, organizational charts database 404 lists the protocols associated with the title and position of each employee in an organizational hierarchy, such as "Human Resource Manager reports to Vice President of Administration." enterprise electronic calendar 400 and the various databases illustrated in FIG. 4 may reside in the same or separate storage devices (such as storage devices 402 and 410).

Additionally, PCP 305 contains rule recognizer 405 which matches user and event inputs with the entries stored in enterprise protocols database 406. For example, rule recognizer 405 recognizes user or event inputs of personal to do lists, personal appointments and other enterprise activities. Rule recognizer 405 then matches the individual inputs to the entries in enterprise protocols database 406. The enterprise electronic calendar may then generate appropriate outputs to the user through GUI 302 as defined by the protocols in enterprise protocols database 406. Such outputs may include reminders, back-ups and convenient browsing capabilities. The outputs are also produced for other enterprise electronic calendars for storage and display.

In certain instances, users may be requested for parameters to be used with the selected protocols. For example, a user A may choose an entry in an enterprise menu on their enterprise electronic calendar requesting to schedule a meeting. GUI 302 may then prompt the user for the names of the other enterprise electronic calendar users joining the meeting, the time range within which the meeting should be scheduled and the location where the meeting is to be held. GUI 302 then transmits the user request to PCP 305 which locates the appropriate protocol in enterprise protocols database 406. The protocol selected may be as follows: "Check all attendees' calendar for the indicated time range and schedule a meeting for the first available day on which all attendees are free and for which the desired location is available. Add event to attendees' to do list/calendar."

Figure 5:
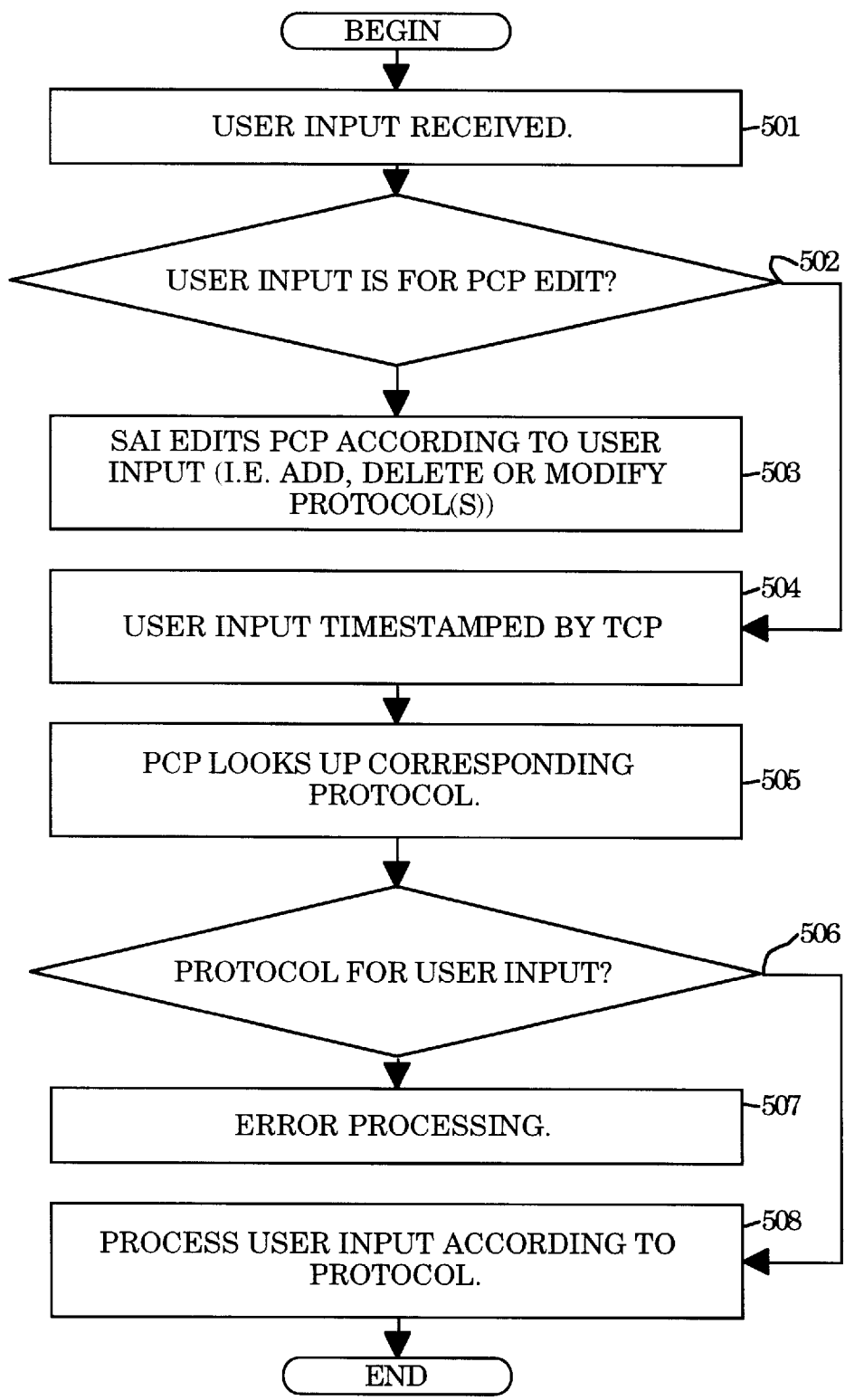
FIG. 5 is a flow diagram illustrating the general steps followed by the present invention.

FIG. 5 is a flow diagram illustrating the general steps followed by the present invention. In step 501, user event input is received through GUI 302 on computer 201. In step 502, it is determined whether the user event input is for editing enterprise protocols database 406. If the user event input is for editing enterprise protocols database 406, then in step 503, a system administrator performs the edits by adding a new protocol or deleting or modifying an existing protocol through SAI 304. In step 504, if the user event input is not for editing enterprise protocols database 406, then the user event input is timestamped by TSC 303.

In step 505, PCP 305 looks up a protocol in enterprise protocols database 406 corresponding to the user event input using rule recognizer 405. In step 506, if there are no protocols for the particular user event input, then in step 507, error processing is performed. For example, an error message and a prompt to try again is displayed to the user. Otherwise, in step 508, if there is a corresponding protocol in enterprise protocols database 406 for the particular user event input, then the user event input is processed according to that protocol. For example, PCP 305 sends messages to the user through GUI 302, such as sounding a beep on the computer or adding event deadlines to the user's to list. The following descriptions for FIGS. 6a and 6b illustrate examples of how user event inputs are processed according to protocols found in enterprise protocols database 406.

FIG. 6a is a flow diagram illustrating exemplary steps in processing user event inputs according to an exemplary enterprise protocol, referred to herein as Protocol 1. It is assumed for illustration purposes that the steps in the flow diagram are for an enterprise electronic calendar equipped with e-mail access and some type of calendar manager program. More specifically, in the presently preferred embodiment, the illustrated process is being performed on a Sun Workstation using e-mail and Sun Microsystems Inc.'s Calendar Manager which provides to do list and calendar functions to a user. While some events in the flow diagram represent activities which take place today such as the receipt of physical or electronic mail, other events represent activities performed with respect to the enterprise electronic calendar only.

Protocol 1 in this exemplary implementation is as follows: "If event happened is résumé arrives, then acknowledge receipt of résumé within 7 days of receipt of résumé and call candidate for interview or reject within 28 days of receipt of résumé . Add events to user to do list." Given protocol 1, since each user or event input is time stamped by TSC 303, PCP 305 can automatically calculate the deadlines for acknowledging receipt of the résumé and getting back to the candidate.

For example, in step 601, on January 2, a résumé of John Candidate arrives by U.S. Mail addressed to Mark Manager. In step 602, on January 2, Mark Manager selects the "Event Happened" menu on his enterprise electronic calendar and chooses event "Résumé Arrives". In step 603, on the same date, the enterprise electronic calendar requests Mark Manager for a name to address this event. Mark Manager types John in response.

In step 604, still on the same date, PCP 305 of the enterprise electronic calendar locates Protocol 1 in enterprise protocols database 406 and automatically adds the following to Mark Manager's to do list: "John: acknowledge receipt of résumé. Deadline: Jan. 9, 1995" and "John: call candidate for interview or reject. Deadline Jan. 30, 1995." In step 605, on Jan. 8, 1995, Mark Manager queries his to do list and realizes that he has to acknowledge receipt of the résumé to John within the next day.

FIG. 6b is a flow diagram illustrating another exemplary protocol, referred to herein as Protocol 2, for use with the present invention's enterprise electronic calendar. In this exemplary embodiment, Protocol 2 is as follows: "If event happened is start focal process, then for all managers, meet with direct reports within 28 days of the start of focal process and return final focal reports to human resource representatives within 56 days of start of focal process. For all direct reports, return draft of focal report to manager within 42 days of start of focal process. Add events to user to do list."

For example, in step 611, it is June 1 and Richard Human Resource Manager receives a reminder to start focal process.

In step 612, on the same day, Richard selects the "Event Happened" menu on his enterprise electronic calendar and chooses event "Start focal process." In step 613 on the same day, the enterprise electronic calendar asks Richard for a name to address this event by. Richard types "Annual Focals." In step 614, PCP 305 of the enterprise electronic calendar locates Protocol 2 in enterprise protocols database 406 and automatically adds events A:"Annual Focals: Meet with direct reports. Deadline: Jun. 29, 1995" and B:"Annual Focals: Return final focal reports to human resource representatives. Add deadline: Jul. 27, 1995 to the to do lists of all managers." The enterprise electronic calendar also adds event C:"Annual Focals: Return draft of focal report to manager. Add deadline: Jul. 13, 1995 to the to do lists of all direct reports."

In step 615, managers and direct reports query their own to do lists to determine their responsibilities during the focal process. Appropriate reminders are output to the managers and direct reports by PCP 305 directly or through GUI 302 according to the respective deadline dates.

What has been described is an enterprise electronic calendar providing enterprise oriented functionality to users in an enterprise through a protocol checking process and a set of enterprise protocols. The invention has equal application as a manager of events in a distributed system.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. An enterprise electronic calendar residing in at least one computer, said enterprise electronic calendar for use in an enterprise for automating various enterprise oriented tasks given user inputs on the computer interfaced to other computers by a network, the enterprise electronic calendar comprising:

at least one enterprise protocols database configured to store at least one set of enterprise protocols used in determining how each said user inputs are to be processed; and a protocols checking process coupled to said enterprise protocols database configured to accept said user input, search for an enterprise protocol in said at least one enterprise protocols databases which match said user input, retrieve said enterprise protocol from said at least one enterprise protocols database and automatically produce responsive action relayed to a user in said enterprise through said enterprise electronic calendar or through other enterprise electronic calendars in said network according to said enterprise protocols.

2. The enterprise electronic calendar of claim 1 further comprising a timestamp controller for monitoring user inputs made on said computer and stamping said user inputs with time information indicating when said user inputs occurred, said timestamp controller coupled to said protocols checking process.

3. The enterprise electronic calendar of claim 1 further comprising a graphical user interface through which a user interacts with said enterprise electronic calendar on said computer, said graphical user interface coupled to said protocols checking process.

4. The enterprise electronic calendar of claim 1 wherein said protocols checking process comprises a rule recognizer for recognizing said user inputs and identifying corresponding enterprise protocols from said enterprise protocols database.

5. A method for implementing an enterprise electronic calendar for use in an enterprise for automating various enterprise oriented tasks given user inputs on at least one computer, the computer interfaced to other computers by a network, the method comprising the steps of:

storing at least one set of enterprise protocols in at least one enterprise protocols database;

determining how said user inputs are to be processed by said enterprise electronic calendar by searching a corresponding one of said set of enterprise protocols in said enterprise protocols database matching said user inputs; and producing action responsive to said user inputs as indicated by said set of enterprise protocols, said action being performed on said computer in said enterprise.

6. The method of claim 5 further comprising the steps of:

monitoring user inputs occurring on said computer; and stamping said user inputs with time information indicating when said user inputs occurred.

7. The method of claim 5 further comprising the step of interfacing a user with said enterprise electronic calendar on said computer, said interfacing being performed by a graphical user interface.

8. The method of claim 5 wherein said step of determining further comprises the step of identifying said corresponding one of said set of enterprise protocols from said enterprise protocols database.

9. A computer system with an enterprise electronic calendar for automating various enterprise oriented tasks given user inputs comprising:

a storage device containing,
        data defining at least one enterprise protocols database configured to store at least one set of enterprise protocols used in determining how each of said user inputs are to be processed, and
        a protocols checking process module configured to accept user inputs, search for an enterprise protocol in said at least one enterprise protocols database matching said user inputs, retrieve said enterprise protocol from said at least one enterprise protocols database and automatically produce responsive action according to said enterprise protocol; and a processor coupled to said storage device for running said protocols checking process module which operates to accept said user inputs, retrieve corresponding enterprise protocols from said enterprise protocols database and produce responsive actions.

10. The system of claim 9 further comprising a timestamp controller module for monitoring user inputs occurring on said computer and stamping said user inputs with time information indicating when said user inputs occurred, said timestamp controller module contained in said storage device and processed by said processor coupled to said protocols checking process module.

11. The system of claim 9 further comprising a graphical user interface module through which a user interacts with said enterprise electronic calendar on said computer, said graphical user interface module contained in said storage device and processed by said processor.

12. The system of claim 9 wherein said protocols checking process module comprises a rule recognizer for recognizing said user inputs and identifying corresponding enterprise protocols from said protocols database.

13. A manager of events in a distributed system residing in at least one computer, said event manager for use in automating various system oriented tasks given inputs generated by software agents, the event manager comprising:

at least one protocols database configured to store at least one set of protocols used in determining how each said inputs are to be processed; and a protocols checking process coupled to said protocols database configured to accept said inputs, search for an enterprise protocol in said at least one protocols database which match said user inputs, retrieve a corresponding protocol from said protocols database and automatically produce responsive action to be relayed to a software agent within said distributed system.

14. The event manager of claim 13 further comprising a timestamp controller for monitoring said software agent inputs and stamping said inputs with time information indicating when said inputs occurred, said timestamp controller coupled to said protocols checking process.

15. The enterprise electronic calendar of claim 13 wherein said protocols checking process comprises a rule recognizer for recognizing said inputs and identifying corresponding protocols from said protocols database.

16. A method for implementing an event manager for use in a distributed system for automating various tasks given inputs generated by software agents on at least one computer, the computer interfaced to other computers by a network, the method comprising the steps of:

storing at least one set of protocols in at least one protocols database;

determining how said inputs are to be processed by said event manager by looking up a corresponding one of said set of protocols in said protocols database matching said inputs; and producing action responsive to said inputs as indicated by said set of protocols.

17. The method of claim 16 further comprising the steps of:

monitoring inputs generated by said software agents; and stamping said inputs with time information indicating when said inputs occurred.

18. The method of claim 16 wherein said step of determining further comprises the step of identifying said corresponding one of said set of protocols from said protocols database.

19. A distributed computer system with an event manager for automating various tasks given inputs from software agents comprising:

a storage device containing, data defining at least one protocols database for storing at least one set of protocols used in determining how each of said inputs are to be processed, and a protocols checking process module configured to accept user inputs, match said user inputs to an enterprise protocol in said at least one protocols database, retrieve said enterprise protocol from said at least one protocols database and automatically produce responsive action according to said enterprise protocol; and a processor coupled to said storage device for running said protocols checking process module which operates to accept said inputs, retrieve corresponding enterprise protocols from said protocols database and produce responsive actions.

20. The system of claim 19 further comprising a timestamp controller module for monitoring inputs generated by said software agents and stamping said inputs with time information indicating when said inputs occurred, said timestamp controller module contained in said storage device and processed by said processor coupled to said protocols checking process module.

21. The system of claim 19 wherein said protocols checking process module comprises a rule recognizer for recognizing said inputs and identifying corresponding protocols from said protocols database.

\* \* \* \* \*